(12) United States Patent
Karras et al.

(10) Patent No.: US 9,002,207 B1
(45) Date of Patent: Apr. 7, 2015

(54) PHOTONIC RADIO FREQUENCY FRONT END RECEIVER

(75) Inventors: Thomas W. Karras, Berwyn, PA (US); Stephen Robertson, Harleysville, PA (US); Arthur C. Paolella, Jamison, PA (US); William J. Taft, Yardville, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 212 days.

(21) Appl. No.: 13/564,679

(22) Filed: Aug. 1, 2012

Related U.S. Application Data

(60) Provisional application No. 61/515,281, filed on Aug. 4, 2011.

(51) Int. Cl.
*H04B 10/00* (2013.01)

(52) U.S. Cl.
CPC ........................... *H04B 10/22* (2013.01)

(58) Field of Classification Search
None
See application file for complete search history.

(56) References Cited

U.S. PATENT DOCUMENTS

| | | | |
|---|---|---|---|
| 8,135,288 B2 * | 3/2012 | Franklin | 398/196 |
| 2007/0009205 A1 * | 1/2007 | Maleki et al. | 385/27 |
| 2010/0028012 A1 * | 2/2010 | Ng | 398/116 |

OTHER PUBLICATIONS

Sun, et al., "Low-loss slow light inside high contrast grating waveguide", High Contrast Metastructures, Proceedings of the SPIE, 2012, pp. 82700A, vol. 8270.
Overton, "Integrated Photonics: High contrast gratings forge ultralow-loss, slow-light waveguide", Laser Focus World, Mar. 27, 2012.
Zablocki, et al., "Chip-scale photonic routing fabrics for avionic and satellite applications", Avionics, Fiber-Optics and Photonics Technology Conference (AVFOP), Oct. 4-6, 2011, IEEE, pp. 75-76.
"Photonic Crystals: Photonic-crystal switch is ultracompact", Laser Focus World, Mar. 1, 2008, retrieved from <http://www.laserfocusworld.com/articles/print/volume-44/issue-3/world-news/photonic-crystals-photonic-crystal-switch-is-ultracompact.html>.
Rylyakov, et al., "Silicon Photonic Switches Hybrid-Integrated With CMOS Drivers", IEEE Journal of Solid-State Circuits, Jan. 2012, pp. 1-10, vol. 47, No. 1.

\* cited by examiner

*Primary Examiner* — Ken Vanderpuye
*Assistant Examiner* — Merlin Brito Peguero
(74) *Attorney, Agent, or Firm* — McDermott Will & Emery LLP

(57) ABSTRACT

A compact photonic radio frequency front end receiver system including a laser chip source, radio frequency and LO inputs, an optical modulator chip coupled to the laser source and the radio frequency and LO inputs, a millimeter scale optical radio frequency multi-pole filter coupled to the optical modulator, an optical switch array chip coupled to the optical radio frequency multi-pole filter, and a detector chip coupled to the optical switch array, all with micro-optic coupling, heterodyne signal recovery, and wavelength locking.

21 Claims, 3 Drawing Sheets

PHOTONIC RADIO FREQUENCY FRONT END RECEIVER

CROSS-REFERENCE TO RELATED APPLICATION

This application claims the benefit of U.S. Provisional Application No. 61/515,281, filed Aug. 4, 2011, entitled "PHOTONIC RADIO FREQUENCY FRONT END RECEIVER," the disclosure of which is hereby incorporated by reference in its entirety including attachments for all purposes.

STATEMENT REGARDING FEDERALLY SPONSORED RESEARCH OR DEVELOPMENT

Not applicable.

BACKGROUND

The present invention generally relates to receivers, and more particularly to compact photonic radio frequency receivers used in the front end of space flight and airborne communications and EW/ISR systems.

Space and airborne communications systems can benefit from a significant increase in data rates and coverage on the ground, in addition to an increase in the number of antenna apertures and receiver channels. Conventional front end receivers can limit the capacity in each of these areas. The front end of a receiver for space flight communication applications typically take up about 30% of the payload mass of a space communication system. A compact, low mass receiver could reduce that value or increase the capacity of the system. However, while a compact receiver is desirable, creating the compact receiver may be difficult because available components and packaging are too large, do not provide needed functionality, and may not be designed for space applications.

SUMMARY

According to one aspect of the present disclosure, a compact photonic radio frequency front end receiver system is provided for operation with either analog or digital data signals. The system includes a laser source chip, radio frequency and local oscillator (LO) inputs for frequency translation, an optical modulator chip coupled to the laser source and the radio frequency and LO inputs, a millimeter scale optical radio frequency multi-pole filter coupled to the optical modulator, an optical switch array chip coupled to the optical radio frequency multi-pole filter, and a detector chip coupled to the optical switch array. In some aspects, all coupling of these millimeter scale components is through free space micro-optics and chip and wire technology so as to produce a hybrid compact receiver. The laser source is configured to generate a single mode laser light beam that acts as a carrier for the radio frequency and LO signals input through the radio frequency input.

In some aspects, a millimeter scale optical modulator chip is coupled to the laser source chip and radio frequency and local oscillator signals from the inputs. The optical modulator chip is configured to modulate the laser light with the radio frequency and local oscillator signals, the modulated laser light having an uplink frequency component, a data component, a local oscillator component, and a resulting downlink frequency component. The millimeter scale optical radio frequency multi-pole filter is coupled to the optical modulator chip and is configured to wavelength lock the laser source chip and to separate a desired spectral band in the modulated laser light by filtering a desired downlink frequency component from all other components of the modulated laser light. The millimeter scale optical switch array chip is coupled to the optical radio frequency multi-pole filter and is configured to switch and combine multiple channels of the filtered modulated laser light. The millimeter scale detector chip is coupled to the optical switch array chip and is configured to mix the desired downlink frequency component with a carrier recovery signal, both carried by the laser light, so as to recover, through a heterodyne process, a radio frequency output of the desired downlink frequency component.

According to a further aspect of the present disclosure, a method of using photonics is provided. The method includes converting radio frequency signals from an uplink source to an optical carrier using millimeter scale optics, the frequency signals including an uplink frequency component and a data component, and adding a downlink frequency component to the optical carrier. The method also includes filtering the uplink link or down link frequency component from the optical carrier using a millimeter scale optical radio frequency multi-pole filter, and detecting the downlink frequency component and the data component of the optical carrier for radio frequency downlink.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
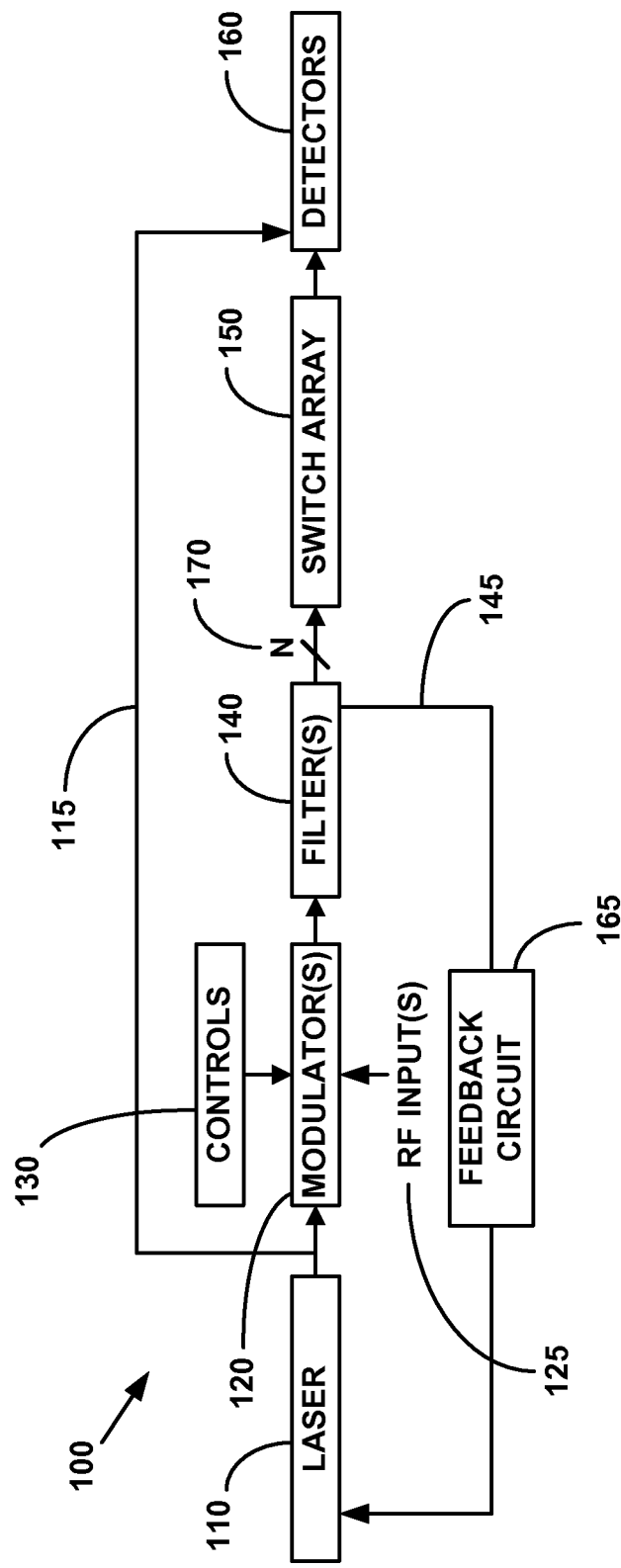
FIG. 1 is a block diagram illustrating an example of a compact photonic radio frequency (RF) front end receiver according to some aspects of the disclosure.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

According to various aspects of the subject technology, a compact receiver is achieved using millimeter scale photonic components coupled with micro-optic and chip-and-wire technology. The compact receiver reduces the payload mass required for a communication system. A reduction of this mass, an associated reduction in size and component cost, and an increase in radio frequency (RF) carrier bandwidth can enable next-generation military and commercial communication satellites to cover a larger ground footprint with higher data rates and a larger number of beams at lower cost, such as by paralleling several such compact receivers together. Broadband capability can also allow the compact receiver to handle multiple bands simultaneously.

For communication systems, uplinks and downlinks to and from the ground, air, or other space platforms use radio frequency (RF) or millimeter wave (mmwave) carriers because of limitations imposed by atmospheric and cloud transmission. According to aspects of the disclosure, some functions of a communication system performed on a spacecraft (e.g., the front end following the antennas of the spacecraft and before high power amplification) or other mass-sensitive platform are implemented with optical carriers. The functions generally performed in a photonic RF communications system according to aspects of the subject technology include (1) conversion of RF signals to an optical carrier, (2) frequency conversion of uplink frequency to downlink frequency, (3) filtering of the down link signal stream into channels needed for the downlink, (4) switching and combing those filtered sub-streams into new data streams, and (5) converting the new data streams into the electrical domain for amplification and transmission to the ground or elsewhere.

According to one aspect of the present disclosure, a compact photonic radio frequency front end receiver system includes a laser source chip, radio frequency and local oscillator (LO) inputs for frequency translation, an optical modulator chip coupled to the laser source and the radio frequency and LO inputs, a millimeter scale optical radio frequency multi-pole filter coupled to the optical modulator, an optical switch array chip coupled to the optical radio frequency multi-pole filter, and a detector chip coupled to the optical switch array. In some aspects, all coupling of these millimeter scale components is through free space micro-optics and chip and wire technology so as to produce a hybrid compact receiver. The optical modulator modulates the laser light from the laser source with the radio frequency and LO signals. The optical radio frequency multi-pole filter separates a selected spectral band of the modulated laser light from the rest of the modulated laser light forming a single channel. With multiple such filters, there can be multiple channels which the optical switch array switches and combines into different combinations of the filtered laser light. The combined signal can be detected back to an electronic radio frequency signal by the detector. The hybrid character of the assembly allows easy substitution of components for different applications while still being suitable for rigorous environments found in space flight and airborne applications.

Package size and weight can dominate the size and weight of the front end of a communication system. Aspects of the subject technology provide a compact receiver that can reduce the package size or weight, for example by a factor of ten or more. In some aspects, the compact receiver has dimensions on a 1" or 2" scale at most, although larger receivers can be used. Thus, in some advantageous aspects of the subject technology, components of the compact receiver are of millimeter scale or smaller, meet the functional needs of the system, and are suitable for space and airborne applications. Examples of such applications include but are not limited to radio frequency Electronic Warfare (EW) and Intelligence, Surveillance and Reconnaissance (ISR) applications.

The example of a compact photonic radio frequency (RF) front end receiver system illustrated in the block diagram of FIG. 1 can exhibit some or all of the characteristics outlined above. Receiver system 100 in FIG. 1 includes laser source 110, dual optical modulator 120, controls 130, optical RF multi-pole filter(s) 140, optical switch array 150, and detectors 160.

Laser source 110, for example a laser source chip, generates an optical carrier in the form of laser light and has an optical power level sufficient to meet system gain and noise figure goals (e.g., 250-500 mw). The laser source also has sufficient electrical efficiency such that laser temperature control power, which may dominate system electrical power requirements, is no more than current system power requirements. For example, laser sources with electrical efficiencies greater than 15% can be used. Laser sources with higher electrical efficiencies such as 20% to 25%, 40% to 50%, or even higher also can be used.

In some aspects, laser source 110 has a wavelength of about 1550 nanometers to be compatible with telecom component characteristics (thus drawing off of that large technology base), controllable wavelength so that the laser source is compatible with wavelength locking to a filter, a linewidth narrow enough to be compatible with megahertz (MHz)-class channelization, and/or relative intensity noise (RIN) that is sufficiently low so as to not dominate system noise. For example, a semiconductor distributed feedback (DFB) laser that satisfies the foregoing requirements is used for laser source 110. Other laser sources with other characteristics also can be used if they are sufficiently small.

Optical modulator 120 is configured to modulate the laser light with the radio frequency and local oscillator signals. In some aspects, the modulator places signals from RF and LO input(s) 125 on the optical carrier with a bandwidth of at least 95 gigahertz (GHz), for example, to be compatible with projected data rate needs. More limited bandwidth capability (e.g., 5-30 GHz) may be adequate for some applications. Optical power handling capacity for the modulator should be compatible with that of the laser source. Optical modulator 120 is used to place local oscillator (LO) and uplink signals on an optical carrier with a bandwidth difference required for frequency translation from up link frequencies to downlink frequencies. The modulated laser light has an uplink frequency component, a data component, a local oscillator component, and a resulting downlink frequency component. In some aspects, optical modulator 120 is packaged as one or more optical modulator chips.

One example of optical modulator 120 includes a chip having two Multi-Quantum-Well (MQW) Segmented Travelingwave Electroabsorption Modulators (EAM). The chip can be a lumped element, traveling wave design, or segmented traveling wave design depending upon the frequencies involved. Other types of optical modulators can be used, for example Franz-Keldysh effect based electroabsorption modulators or miniature Mach Zehnder Interferometer (MZI) based modulators (MZMs).

One or more optical RF multi-pole filters 140 are coupled to the optical modulator. The filters are configured to wavelength lock the laser source and to separate a desired spectral band in the modulated laser light by filtering a desired downlink frequency component from all other components of the modulated laser light. In some aspects, optical filters 140 have passbands that meet communication system requirements (e.g., 1 MHz to 1 GHz 3 dB channel width, less than 0.5 dB ripple, and 70 dB out of band rejection). The filters are also compatible with wavelength locking with the laser source. Optical power handling and insertion loss should not limit RF signal recovery at the system output. For example, a filter that can handle an optical power of 10 mw with less than 1 dB of loss in the passband can be used. Alternatively, in some aspects, higher losses such as 2 to 7 dB can be acceptable. Since the filter will reject the carrier, in some aspects heterodyne signal recovery is used at the detector. This signal recovery can be provided by re-routing a part of the laser carrier from to the detector 160 using path 115. Similarly, locking of the laser wavelength to that of the filter can be performed using a feedback circuit 165 that controls the current through the laser as shown by path 145 between the filter 140 and the laser source 110. Each optical RF multi-pole filter 140 may include N channel(s) 170, where N is one or more. Each channel of the filter may form a respective modulated and filtered laser light.

According to aspects of the invention, millimeter scale filters should satisfy the foregoing requirements and could provide center frequency and channel width tuning. Filters that are based on a monolithic assembly of several very high Q and free standing whispering gallery mode resonators are suitable for passbands of 1-100 MHz. Fabry-Pérot filters or fiber Bragg grating filters are suitable for passbands above 100 MHz. The specific filter design, particularly the number of poles used, is dependent upon the passband requirements. The subject technology is not limited to use of these filters within these example frequency ranges. As various filter technologies mature, these and other filters can be used for various passbands.

One or more optical switch array(s) 150 are coupled to the optical radio frequency multi-pole filter and are configured to switch and combine multiple channels of the modulated and filtered laser light. In some aspects, switch array(s) 150 are compatible with redundancy, combining operations, and port counts needed in communications applications (e.g., 4×4 to 16×16). Optical power handling and insertion loss should not limit RF signal recovery at the system output (e.g. 10 mw and less than 1 dB loss). In some aspects, optical switch array(s) 150 are based on silicon waveguide-based thermo-optic or electro-optic MZIs or photonic crystal technologies. The switch arrays can be included in one or more optical switch array chips.

Optical signal distribution losses after the switch array 150 and before conversion at the detector 160 should be less than 1 dB at even the highest RF frequencies (e.g., 95 GHz) and should be mechanically small and flexible for easy harness routing. Signal distribution can take place through optical fibers, which can satisfy these loss and routing requirements.

One or more detectors and circuits 160 are coupled to the optical switch array(s) and are configured to mix the desired downlink frequency component with a carrier recovery signal, both carried by the modulated, filtered, and switched laser light, so as to recover, through a heterodyne process, a radio frequency output of the desired downlink frequency component. In some aspects, the detectors and circuits for RF signal recovery are capable of handling the frequency translated signal with high responsivity (e.g., about 1 ma/mw). Commercial detector and circuit chips that meet the bandwidth requirements of the frequency translated signal down can be used.

According to certain aspects, the components of a compact photonic RF front end receiver system are packaged with millimeter scale micro-optics and microelectronic elements in a sealed package. Millimeter scale micro-optical elements compatible with 1" to 2" scale packaging can be used for optical coupling between the components of the compact receiver. In some aspects, the optical elements are free space micro-optics.

Figure 2:
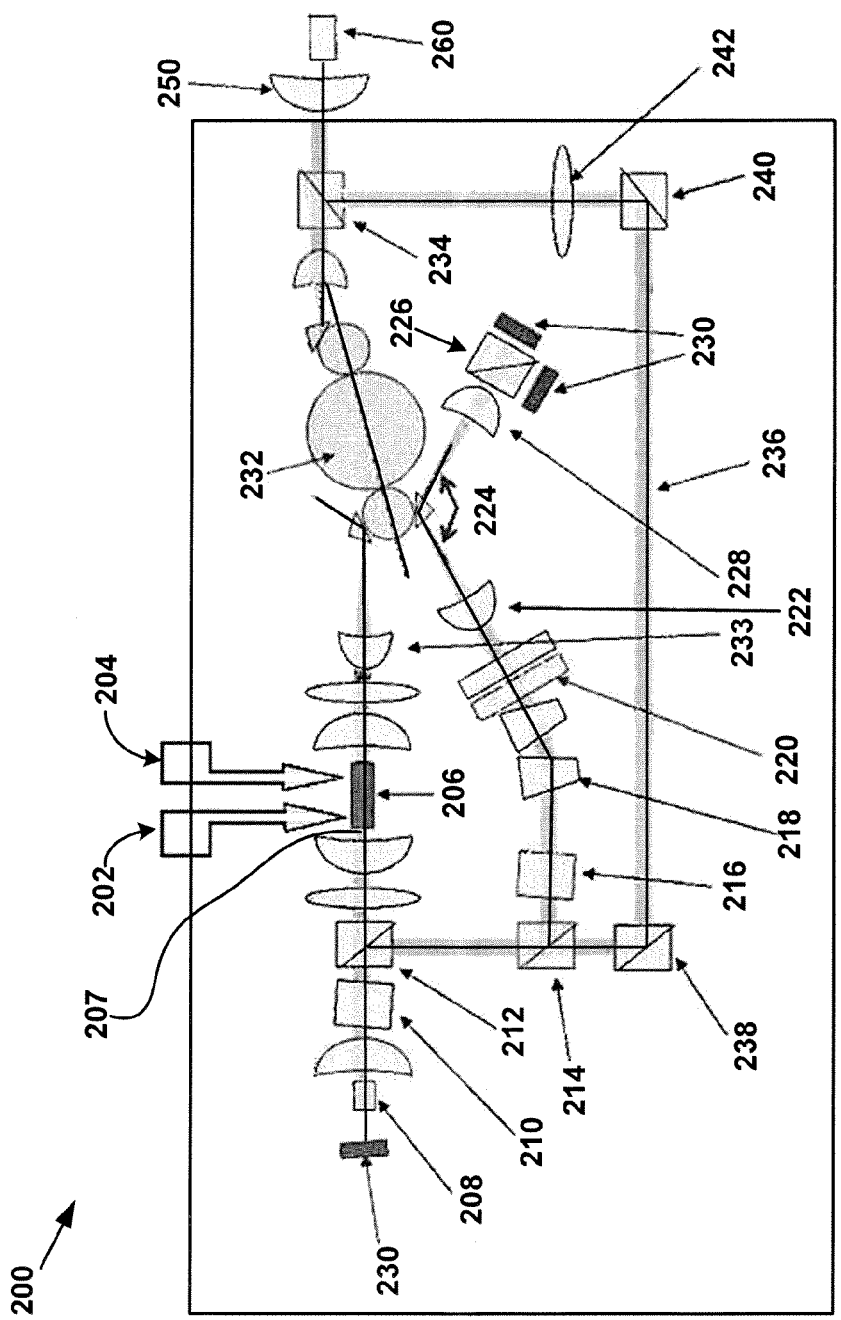
FIG. 2 illustrates an example of one layout for micro-optics and microelectronic elements for a compact photonic RF front end receiver according to some aspects of the disclosure.

Micro-optical elements such as isolators, splitters, lenses, mirrors, and combiners can couple the components into architectures with micro-electronic elements that provide wavelength locking of the laser to the filter in addition to heterodyne signal recovery with carrier reinsertion. Wavelength locking can be necessary since an original carrier frequency can be blocked by the filter. Some aspects of the optical coupling do not allow polarization variation with changes in time, temperature, and vibration. Electrical coupling can be implemented with micro-electronic wire and ribbon bonding in commercial sealed packages. An example of a portion of one layout for such micro-optical and microelectronic elements is illustrated in FIG. 2. The portion shown in FIG. 2 includes components from RF inputs to an optical fiber connection to a switch array.

RF signals enter system 200 through RF inputs 202 and 204. A biased local oscillation (LO) signal is input through RF input 202, and a modulated RF signal carrying data from an uplink source is input through RF input 204. The signals are fed to dual electroabsorption modulators 206. Light 207 from laser source 208, for example a DFB laser, is also input to the modulators through isolator 210, beam splitter 212, and focusing optics 214. The two electroabsorption modulators modulate light 207 with both the local oscillation and the signal from the uplink source carrying the data, thereby adding a downlink frequency component, an uplink frequency component, and a data signal component to the original light carrier 207.

A portion of the light from laser source 208 is directed by beam splitter 212 to beam splitter 214. A portion of the light from beam splitter 214 is directed through isolator 216, optical wedge 218, wave plates 220, and long working distance lens 222 to wavelength locking mechanism 224. The wavelength locking mechanism includes beam splitter 226, long working distance lens 228, and electro-optical phase detectors 230. These components form an electro-optical phase locked loop for laser 208 that compensates for wavelength drift and distortions in light 207 that can be caused by some elements of system 200. The subject technology is not limited to this wavelength locking approach.

System 200 also includes a multi-pole filter assembly 232, for example filter 140 discussed above. Light from dual electroabsorption modulators 206 enters the filter assembly through long working distance lens 233, and a part of it is coupled into the wavelength locking mechanism 224. The filter assembly filters the light from the dual electroabsorption modulators. In particular, the filter removes the uplink frequency, carrier components, and unwanted parts of the down link frequency leaving only the selected part of the downlink frequency and data signal components.

Light from the filter assembly is combined by combiner 234 with collimated laser light 236 from beam splitter 214 by way of mirrors 238 and 240. The collimated light is steered to combiner 234 by steering lens 242. Combiner 234 can serve to reinsert an optical carrier in the form of collimated laser light 236 into the light exiting the filter assembly 232. The combined light exits system 200 through focusing lens 250, which focuses the light onto fiber 260 to an optical switch array (not show) and ultimately a detector the performs the heterodyne detection recovery of the selected portion of the downlink spectral band.

While various isolators, lenses, splitters, combiners, and mirrors are shown in FIG. 2 as free-space optics, various of these elements can be replaced with high contrast gratings (HCGs). HCGs are formed of four "walls" arranged in a square open structure with alternating silicon and air gaps. HCGs have also been formed in other shapes such as tubes. HCGs can be configured to function as isolators, lenses, splitters, combiners, and mirrors, among other elements.

The system shown in FIG. 2 includes hybrid integration of free space micro-optics or gratings with electronic components. This hybrid integration permits relatively lower cost and more rapid modification and customization of a photonic radio frequency front end receiver for particular applications as compared to fabricating new chips that fully integrate the optical and electronic components. As one possible result, some aspects of the subject technology can be used in various diverse markets. For example, these markets can include data transmission and communications markets, optical components markets, EW and ISR markets and photonics and optical computing markets. The subject technology is not limited to these markets.

Figure 3:
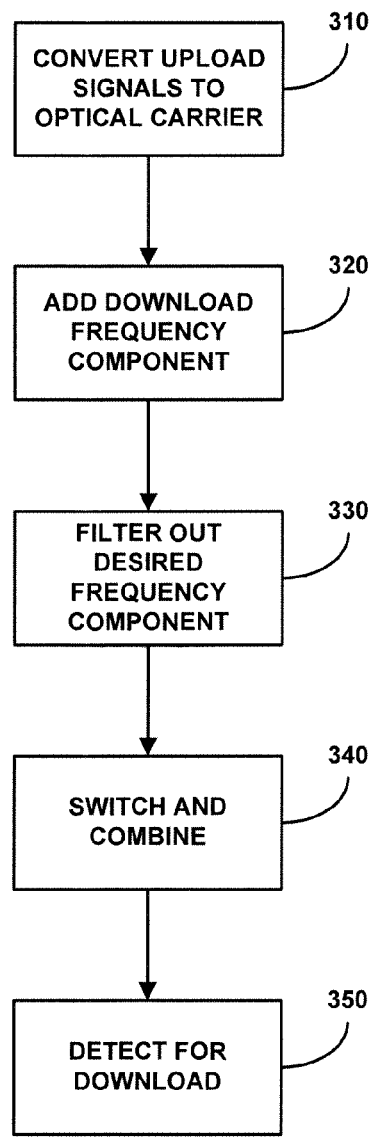
FIG. 3 is a flowchart illustrating operations performed by a compact photonic RF front end receiver according to some aspects of the disclosure.

FIG. 3 is a flowchart illustrating operations performed by a compact photonic RF front end receiver according to some aspects of the disclosure. In step 310, RF signals from an uplink source are converted into information on an optical carrier (e.g., single mode laser light). The RF signals include an uplink frequency component and a data component. In step 320, RF signals and an LO generate a downlink frequency component and all are added to the optical carrier. Steps 310 and 320 can occur in the opposite order as shown or simultaneously. In some aspects, these steps are performed by two electroabsorption modulators.

The optical carrier is filtered in step 330 to remove the uplink frequency, carrier and unwanted elements of the downlink component. The component does not have to be removed completely, but should be removed to the degree discussed above with respect to filter(s) 140. The filtered optical carrier from several similar channels can be switched and combined to form new data streams in step 340, and then converted by detectors to the electrical domain for RF downlink in step 350. Conversion can be performed by mixing the selected downlink frequency component and the data component with the optical carrier.

As used in this disclosure, a phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Likewise, while operations are disclosed in a particular order, this should not be understood as requiring that such operations be performed in the particular order or in sequential order, or that all disclosed operations be performed, to achieve desirable results. Moreover, the separation of various system components in the aspects described above should not be understood as requiring such separation in all aspects.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Headings and subheadings, if any, are used for convenience only and do not limit the subject disclosure.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A compact photonic radio frequency front end receiver system, comprising:
    a laser source chip configured to generate laser light;
    radio frequency and local oscillator inputs for radio frequency and local oscillator signals;
    a millimeter scale optical modulator chip coupled to the laser source chip and the radio frequency and local oscillator inputs, the optical modulator chip configured to modulate the laser light with the radio frequency and local oscillator signals, the modulated laser light having an uplink frequency component, a data component, a local oscillator component, and a resulting downlink frequency component;
    a millimeter scale optical radio frequency multi-pole filter coupled to the optical modulator chip and configured to wavelength lock the laser source chip, wherein the optical radio frequency multi-pole filter comprises at least one channel, each of the at least one channel being configured to form a respective modulated and filtered laser light by separating a respective desired spectral band in the modulated laser light by filtering a respective desired downlink frequency component from all other components of the modulated laser light;
    a millimeter scale optical switch array chip coupled to the optical radio frequency multi-pole filter and configured to form a modulated, filtered, and switched laser light by switching and combining a respective modulated and filtered laser light of one or more channels of the at least one channel; and
    a millimeter scale detector chip coupled to the optical switch array chip and configured to mix a desired downlink frequency component of the modulated, filtered, and switched laser light with a carrier recovery signal, both carried by the modulated, filtered, and switched laser light, so as to recover, through a heterodyne process, a radio frequency output of the desired downlink frequency component of the modulated, filtered, and switched laser light.

2. The system of claim 1, wherein the laser source chip comprises a millimeter scale semiconductor distributed feedback laser.

3. The system of claim 1, wherein the optical modulator chip comprises electroabsorption modulator chips.

4. The system of claim 1, wherein the optical modulator chip comprises Mach Zehnder Interferometer based modulators.

5. The system of claim 1, wherein the optical radio frequency multi-pole filter comprises a monolithic assembly of millimeter scale multiple free standing whispering gallery mode resonators.

6. The system of claim 1, wherein the optical radio frequency multi-pole filter comprises an assembly of photolithographically formed resonators on a single or multiple chips.

7. The system of claim 1, wherein the optical radio frequency multi-pole filter comprises an assembly of Fabry-Pérot filters.

8. The system of claim 1, wherein the optical radio frequency multi-pole filter comprises a fiber Bragg grating filter configured so as to fit in a volume of 1 cm scale.

9. The system of claim 1, wherein the optical switch array comprises silicon waveguide-based Mach Zehnder Interferometers.

10. The system of claim 1, wherein the optical switch array chip comprises silicon based photonic crystals.

11. The system of claim 1, further comprising free space micro-optics configured to transport optical signals between at least two of the laser source chip, the optical modulator chip, the optical radio frequency multi-pole filter, the optical switch array chip, and the detector chip.

12. The system of claim 11, wherein the free space micro-optics further comprise millimeter scale optics.

13. The system of claim 1, further comprising high contrast gratings configured to transport optical signals between at least two of the laser source chip, the optical modulator chip, the optical radio frequency multi-pole filter, the optical switch array chip, and the detector chip.

14. The system of claim 1, further comprising polymer based self-forming waveguides configured to transport optical signals between at least two of the laser source chip, the optical modulator chip, the optical radio frequency multi-pole filter, the optical switch array chip, and the detector chip.

15. The system of claim 1, further comprising optical fiber coupling configured to transport optical signals between at least two of the laser source chip, the optical modulator chip, the optical radio frequency multi-pole filter, the optical switch array chip, and the detector chip.

16. A method of using photonics in a space borne or airborne radio frequency communication system, comprising:
generating a laser source light;
converting radio frequency signals from an uplink source to an optical carrier by modulating the laser source light with local oscillator signals and the radio frequency signals, the modulated laser light having an uplink frequency component, a data component, a local oscillator component, and a resulting downlink frequency component;
wavelength locking the laser source light using an optical radio frequency multi-pole filter, wherein the optical radio frequency multi-pole filter comprises at least one channel, each of the at least one channel being configured to form a respective modulated and filtered laser light by separating a respective desired spectral band in the modulated laser light by filtering a respective desired downlink frequency component from all other components of the modulated laser light;
switching and combining a respective modulated and filtered laser light of one or more channels of the at least one channel, thereby forming a modulated, filtered, and switched laser light; and
mixing a desired downlink frequency component of the modulated, filtered, and switched laser light with a carrier recovery signal, both carried by the modulated, filtered, and switched laser light, so as to recover, through a heterodyne process, a radio frequency output of the desired downlink frequency component of the modulated, filtered, and switched laser light.

17. The method of claim 16, wherein the step of converting the radio frequency signals is performed by electroabsorption modulators.

18. The method of claim 16, wherein the step of converting the radio frequency signals is performed by miniature Mach Zehnder Interferometer based modulators.

19. The method of claim 16, further comprising transporting the optical carrier using free space micro-optics between at least two of the steps of converting, wavelength locking, and switching.

20. The method of claim 19, wherein the free space micro-optics further comprise millimeter scale optics.

21. The method of claim 16, further comprising transporting the optical carrier using high contrast gratings between at least two of the steps of converting, wavelength locking, and switching.

* * * * *